D. A. BENNETT.
CAR-COUPLING.

No. 173,758. Patented Feb. 22, 1876.

UNITED STATES PATENT OFFICE.

DANIEL A. BENNETT, OF WAUSEON, ASSIGNOR OF ONE-HALF HIS RIGHT TO HEMAN A. CANFIELD, OF TEDROW, OHIO.

IMPROVEMENT IN CAR-COUPLINGS.

Specification forming part of Letters Patent No. 173,758, dated February 22, 1876; application filed February 4, 1876.

*To all whom i may concern:*

Be it known that I, DANIEL A. BENNETT, of Wauseon, in the county of Fulton and State of Ohio, have invented certain new and useful Improvements in Car-Couplings; and I do hereby declare that the following is a full, clear, and exact description thereof, reference being had to the accompanying drawings, and to the letters of reference marked thereon, which form a part of this specification.

This invention relates to an improvement in car-couplings, its object being to arrange a coupling-hook, in connection with two draw-heads, so as to act automatically; and it consists in the construction of the various parts of the device, as will be hereinafter more fully described.

Figure 1:
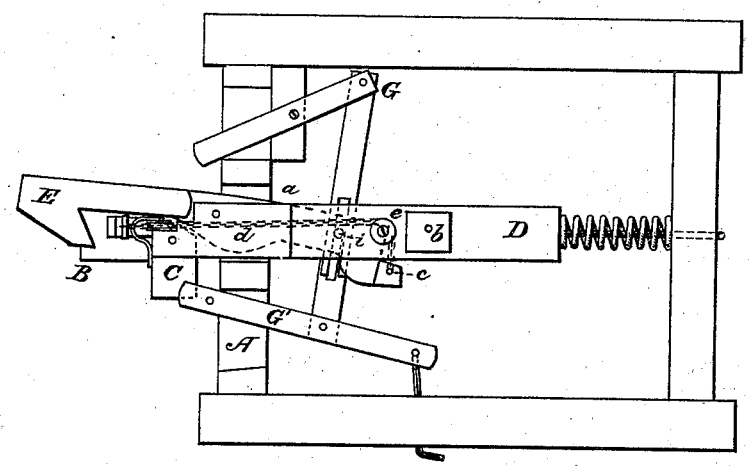
Figure 3:
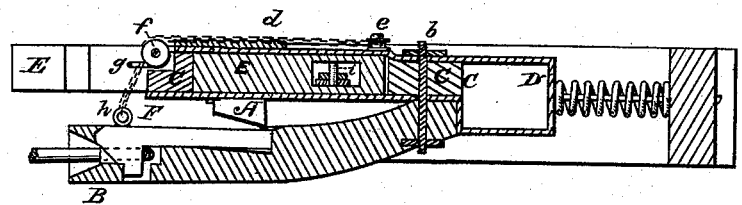
Figure 2:
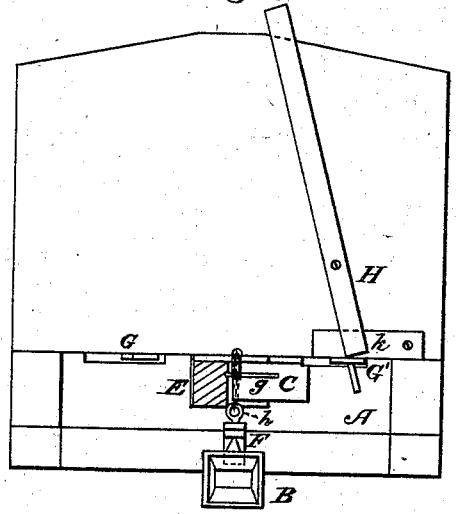

Figure 1 represents a top-plan view of one end of a car-frame with the center sills removed, showing the arrangement of my devices. Fig. 2 is an end view of a freight-car provided with my improved coupling, and Fig. 3 is a longitudinal sectional view through the draw-heads.

A represents the forward sill or cross-beam of the car, beneath which is suspended the lower draw-head B, by means of suitable hangers. This draw-head is constructed with a longitudinal slot in its upper surface for the reception of the coupling-dog F, and has a smaller slot in its under surface for receiving the hook or catch of the dog. The upper surface of the sill is provided with a gain or recess, a, in which rests the upper draw-head, C, which extends back, and is closely riveted to the lower draw-head at b, both draw-heads being firmly united to the spring-box D, which forms a part of the combined draw-head or bumper, and is intended to be used in connection with supplementary spring-boxes on each side, as described in Letters Patent of even date herewith, granted to me. The upper draw-head is made solid at its ends and open at the sides for the reception of the coupling-hook E, which is placed diagonally therein, its shank projecting from one side in front, so that the inner angle of the hook, when in position for coupling, will be nearly on a line with the center of the upper draw-head, which acts as a bumper for receiving the shocks of the square end of the hook in stopping a train.

This hook is made in the irregularly-curved form shown by dotted lines in Fig. 1, and is provided at its rear end with a pin, c, to which is attached the chain d, which passes over the pulleys e and f, and through the loop g, being secured at its other end to the eyebolt h on the coupling-dog F, which is placed loosely within the lower draw-head. The hook E is pivoted to the draw-head C immediately in front of the forward sill, so that it may move freely in the recess a, and be readily removed, if required. The coupling-dog F is provided with a hook or catch at its forward end, which is beveled in the manner shown in Figs. 2 and 3, so as to readily raise and engage with a link in coupling two cars together. The dog also acts as a gravitating weight, in connection with its operating mechanism, for causing the coupling-hook E to engage with the corresponding hook on the next car, and afterward holding the two hooks firmly together in proper position when coupled. G G' are horizontal levers attached to the frame in any suitable manner, and arranged in connection with the hook E so as to operate the coupling mechanism, the hook being provided with a slot in which is placed the pin i, which engages with slots in the ends of the levers, and so enables them to be used in pushing or drawing the hook to one side for the purpose of uncoupling. In freight-cars a vertical lever, H, is attached to the lever G', and extended to the top of the car, so that the cars may be coupled or uncoupled without the necessity of passing between them. The catch k is arranged to engage with the lever G', and thereby hold the coupling-hooks E and F out of position, so that they will not couple with other cars which may be pushed against them while on a side track or in the car-yard.

When two cars provided with the coupling-hook E come together, if the hooks are in position, they are each thrown slightly to one side, passing each other, and are immediately coupled by means of the dogs F, which, acting as gravitating weights, draw the hooks E toward the center line of the draw-heads, and lock them firmly. If only one of the cars to be coupled is provided with the hook E the coupling is effected by means of the lower draw-head and dog F, which also acts automatically. In this case the link in entering the mouth of the draw-head comes in contact with the beveled end of the dog, which is thereby thrown upwardly, and, falling by its weight as soon as the link passes beneath, holds it securely.

By means of the horizontal levers G G' and vertical lever H acting on the hook E, it may be uncoupled from that of the next car, and through the chain $d$ the dog F is also raised at the same time, thus releasing the link, the hook E and dog F always acting together through the medium of their connecting mechanism.

I claim as my invention—

1. The coupling-hook E, in combination with the chain $d$, pulleys $e$ $f$, loop $g$, and dog F, all substantially as and for the purpose specified.

2. The draw-heads B and C, in combination with the hook E, dog F, and chain $d$, substantially as shown and described.

3. The horizontal levers G G' and vertical lever H with catch $k$, in combination with the hook E, dog F, and their connecting mechanism, as and for the purpose set forth.

In testimony whereof I have hereunto affixed my signature this 4th day of February, 1876, in presence of two witnesses.

DANIEL A. BENNETT.

Witnesses:
  E. L. SCHMIDT,
  A. R. BROWN.